(12) United States Patent
Schierholt (10) Patent No.: US 7,996,329 B1
(45) Date of Patent: Aug. 9, 2011

(54) PROFIT OPTIMIZATION

(75) Inventor: Karsten Schierholt, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 2272 days.

(21) Appl. No.: 10/137,713

(22) Filed: Apr. 30, 2002

Related U.S. Application Data (60) Provisional application No. 60/340,364, filed on Dec. 13, 2001.

(51) Int. Cl.
*G06Q 99/00* (2006.01)
(52) U.S. Cl. ......... 705/400; 705/7.37; 705/7.22; 700/99
(58) Field of Classification Search ............... 705/7, 10, 705/26, 400, 1, 16, 28, 7.22, 7.37; 700/99, 700/107
See application file for complete search history.

(56) References Cited

U.S. PATENT DOCUMENTS

| | | | | |
|---|---|---|---|---|
| 5,291,394 A | * | 3/1994 | Chapman | 705/8 |
| 5,971,585 A | * | 10/1999 | Dangat et al. | 700/102 |
| 6,393,332 B1 | * | 5/2002 | Gleditsch et al. | 700/99 |
| 6,463,345 B1 | * | 10/2002 | Peachey-Kountz et al. | 700/99 |
| 6,871,183 B2 | * | 3/2005 | Gilday et al. | 705/10 |
| 7,197,469 B2 | * | 3/2007 | Hegde et al. | 705/7.22 |
| 2002/0072988 A1 | * | 6/2002 | Aram | 705/26 |
| 2002/0123930 A1 | * | 9/2002 | Boyd et al. | 705/14 |
| 2002/0133387 A1 | * | 9/2002 | Wilson et al. | 705/8 |

OTHER PUBLICATIONS

"GM Does It Right", Feb. 1993; Production; pp. 19-20.*
ARC Advisory Group, 'Achieving Profitable to Promise in Distribution Centric Supply Chains,' Dec. 2001, ARCweb.com.

* cited by examiner

*Primary Examiner* — John Hayes
*Assistant Examiner* — Freda A Nelson
(74) *Attorney, Agent, or Firm* — Blakely Sokoloff Taylor & Zafman LLP

(57) ABSTRACT

Profit optimization methods and systems for a supply chain are described. An implementation of the technique includes determining the initial cost of components required to manufacture a product, dynamically determining the cost for substitution of at least one product component, dynamically determining the location of at least one substitute component, and manufacturing the product for the lowest cost based on the results of the cost of substitution and substitute component location determinations. At least one of the cost of substitute components and the component locations may be determined at or near the time of manufacture.

15 Claims, 8 Drawing Sheets

PROFIT OPTIMIZATION

RELATED APPLICATIONS

This application is related and claims priority to Provisional Application Ser. No. 60/340,364, filed Dec. 13, 2001, of which the entire specification of that application is incorporated herewith.

TECHNICAL FIELD

This invention relates to optimizing profits in a supply chain, and more particularly to methods and systems for applying adaptive pricing techniques to product manufacturing.

BACKGROUND

A supply chain is a network of facilities and distribution options that performs the functions of procuring materials, transforming the materials into semi-finished and finished products, and distributing the finished products to customers. Supply chain management (SCM) is a business policy that aims to improve all activities along the supply chain. SCM results in improved integration and visibility within individual companies, as well as flexibility across supply and demand environments.

Product manufacturers strive to maximize profits by charging the greatest price possible for the product, and by optimally matching the supply of products to the demand. However, real world issues often combine to present problems that must be overcome in order to maximize profits. For example, certain types of products, such as computers and fashion items, lose value over time. In addition, supply chain capacity is typically flexible only within certain bounds. Further, customer or product segmentation potential varies by industry. Moreover, a manufacturers' share of variable costs is higher than that of service industries, product demand may be variable, and contracts may limit price adjustments.

SAP AG and SAP America, Inc. provide supply chain management solutions for product manufacturers to help them reach their goals. Some of the solutions are based on the mySAP.com e-business platform (see sap.com for further information). One of the building blocks of the e-business platform is the SAP R/3 component that provides enterprise resource planning functionality. The SAP R/3 product includes a Web Application Server ("Web AS"), an R/3 core, and various R/3 extensions.

The SCM Extensions of R/3 deal with various planning, coordination, execution, and optimization issues that are associated with a supply chain. It would be beneficial to provide a web-based or on-line system that optimizes the alignment of variable customer demand and existing supply capabilities to optimize profits.

SUMMARY

Profit optimization methods, articles and systems for a supply chain and a demand chain are presented. An implementation of the technique includes determining the initial cost of components required to manufacture a product, dynamically determining the cost for substitution of at least one product component, dynamically determining the location of at least one substitute component, and manufacturing the product for the lowest cost based on the results of the cost of substitution and substitute component location determinations. At least one of the cost of substitute components and the component locations may be determined at or near the time of manufacture.

In another implementation, the method includes defining a set of manufacturing rules based on customer segments, allocating critical product components according to preferred customer segments, allocating manufacturing capacity according to the preferred customer segments, and manufacturing the product. The method may include allocating the product components and manufacturing capacity according to a feasibility analysis.

In yet another implementation, the technique includes monitoring product demand and allocation reservations for product components; comparing the product demand and component allocation reservations with demand forecasts at predetermined intervals, dynamically assigning component allocations for preferred customer segments according to a comparison of the forecasted and monitored demand; and manufacturing the product for the preferred customer segments before manufacturing the product for other customer segments.

This implementation may include one or more of the following features. Preferred customer segments may be determined according to predefined rules. Monitoring of product demand and allocation reservations may be conducted in regular intervals. A user may be alerted when a component allocation is changed.

Another profit optimization method includes dynamically monitoring product demand and component allocation reservations, comparing the monitored product demand and component allocation reservations to a forecasted demand, offering customers at least one less expensive substitute component of the product in place of a requested component, and manufacturing the product for a first price if the substitute component is accepted, or manufacturing the product for a second, higher price if the substitute component is not accepted.

This profit optimization method may include one or more of the following features. The Price changes may be imposed in fixed increments. Price changes may be determined according to price sensitivity functions. At least one customer offer may include an optimal price based on a price elasticity value and cannibalization effects.

Yet another profit optimization technique includes determining a product manufacturing cost value, comparing the current price of the product to the cost value and calculating a contribution margin, comparing the contribution margin to a desired target range for a particular customer segment, and adjusting at least one of the product price and a product configuration if the contribution margin is outside the target range. The product manufacturing cost value may include at least one of an assembly cost, available components with known purchase cost, location substitution cost, substitute component costs, and urgent missing supplies cost. The product price may be increased if the contribution margin is below the target range. The product manufacturing cost value may be updated on a regular basis.

A further implementation of a profit optimization technique includes determining a contribution margin for each product order, calculating prices for different product configurations such that product demand will be met for preferred customer segments, presenting different product configurations at the calculated prices to customers, and manufacturing the products selected by the customers.

This implementation may include one or more of the following features. The different product configurations and prices may include at least one of the original product configuration, a plurality of different component substitutions, and lead time considerations.

In yet another implementation, a profit optimizing method includes determining the margin amount of an original customer product order, identifying at least one potential bundled product package containing more than the requested product order that would contribute to overall profits, generating a probability value equal to the likelihood that the customer would accept a bundled product package at a special price, and offering at least one bundled product package at the special price to the customer if the probability value is greater than a predetermined value.

This implementation may include one or more of the following features. The special price may be a discount price that is determined according to a pricing and discount strategy. The pricing and discount strategy may include deriving at least a portion of an order-specific price of a product bundle offering using customer price elasticity functions. Special discount prices may be offered for at least one specific product bundle depending on the price elasticity of the additional product offering. At least one potential bundled product package may be offered that would optimally contribute to overall profits.

The above techniques may all be embodied in an article comprising a computer-readable medium that stores executable instructions for causing a computer system to operate according to the invention as described herein. Moreover, the techniques could all be utilized in a system that may include at least one database storage unit and at least one processor coupled to the storage unit, wherein the processor is operable to operate according to the invention as described herein.

A manufacturer can benefit from utilizing the profit optimization techniques according to the invention by moving from a cost-based to a profit-based supply chain decision-making model. In particular, a manufacturer can use the disclosed techniques to analyze monetary impacts of decision choices on profit. The analytic capabilities allow the manufacturer to determine the cost and the profit of various resource utilization choices, and certain price differentiation choices may become apparent that allow higher average profitability of goods. The techniques also determine how best to use scarce product component resources to achieve maximal profit, and how to get the best possible price from customers. In an implementation, a manufacturer can use price sensitivities to determine optimum prices. Further, the techniques permit the valuation of cross sensitivities and cannibalization effects between different products of the same product family, between different product families, and between a company and its competitors.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The profit optimization techniques described herein function to align variable customer demand and existing supply capabilities. It has been recognized that mismatches of demand and supply are not strictly a Supply Chain Management (SCM) problem or a strict product pricing problem. The profit optimization techniques described below use analytical information about cost of supply and benefit of revenue as a basis for profit-based decision-making support. The techniques extend revenue management approaches (wherein the optimal pricing of existing goods takes into account customer buying behavior) and SCM capabilities (the guaranteed and cost-optimized supply of goods to within certain manufacturing and distribution constraints) in a comprehensive manner. In particular, the profit optimization techniques introduce adaptive pricing techniques into a manufacturing environment.

Figure 1:
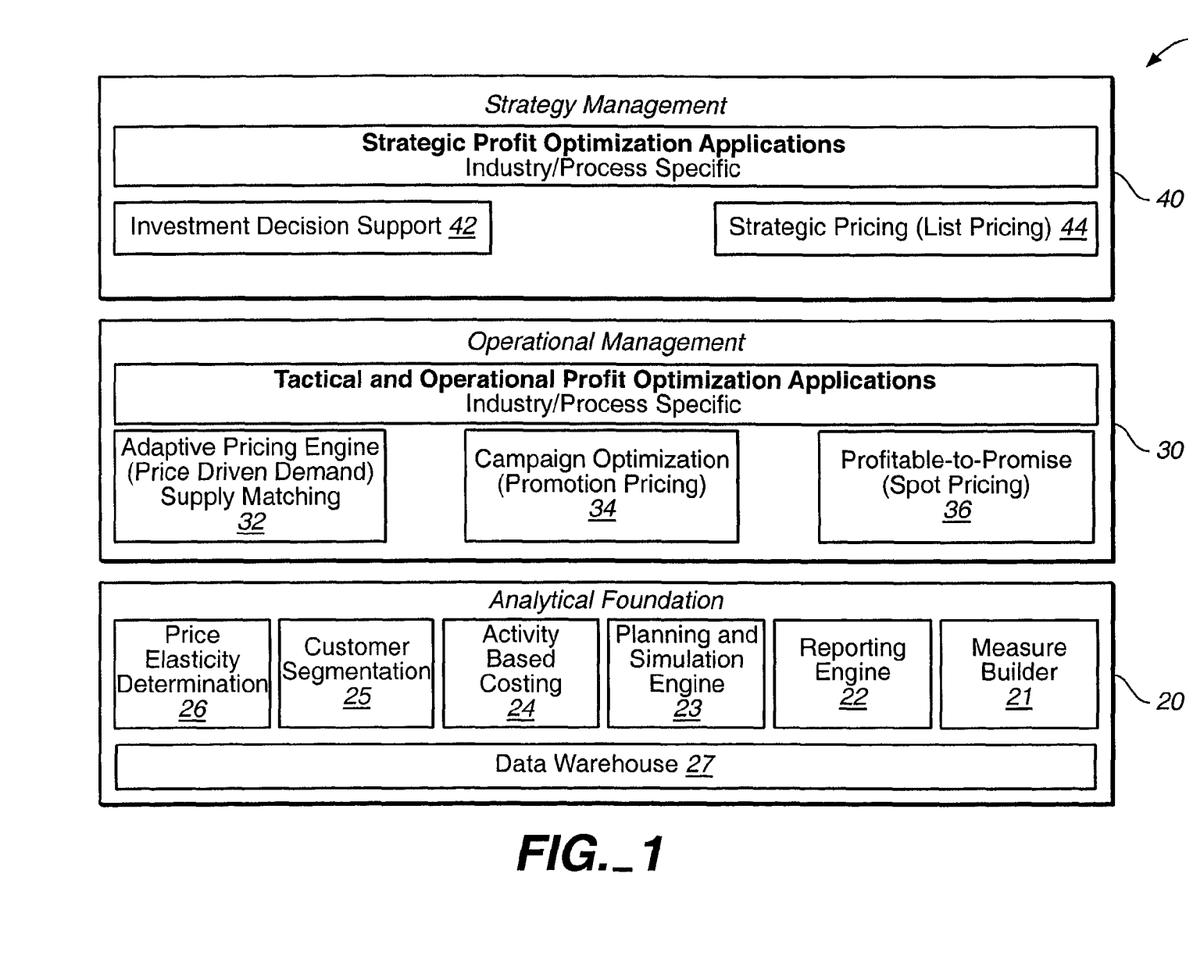
FIG. 1 is a simplified block diagram illustrating the building blocks used for optimizing profit.

FIG. 1 is a simplified block diagram 10 to illustrate the building blocks of the technique for optimizing profit. An analytical foundation 20 includes a measure builder 21 which is capable of analyzing performance metrics, at least one reporting engine 22, a planning and simulation engine 23, an activity based costing application 24, a customer segmentation application 25 and price elasticity determination application 26. These analytical applications gather any required operational data from a data warehouse 27, although some other database, such as a manufacturer's proprietary database, could be utilized. The data warehouse typically contains mainly historical data, such as average sales price for a product, customer discount information, various alternate product configurations and price variations, and the like. Also included is an operational management layer 30 having tactical and operational profit optimization applications that may be industry specific and/or process specific. The operational management layer may include an adaptive pricing engine 32 (to provide price-driven demand and supply matching), a campaign optimization engine 34 (to factor in promotion pricing), and a profitable-to-promise engine 36 (to factor in spot pricing). Lastly, a strategy management layer 40 includes strategic profit optimization applications (which may be industry or process specific) such as an investment decision support engine 42 and a strategic pricing engine 44 (list pricing).

All of the profit optimization applications utilize analytical data, which may be generated by analytical Supply Chain Management (SCM) applications, analytical Customer Relationship Management (CRM) applications, and Financial Analytics applications currently available from SAP AG and SAP America, Inc. A significant part of profit optimization is the ability to determine the cost of manufacturing products in an adaptive supply chain network because the cost of production changes as the state of the supply chain varies. It is thus necessary not only to determine the cost of resources, such as materials, machines and/or human resources, but it is important to also determine the full cost of production processes.

Figure 2A:
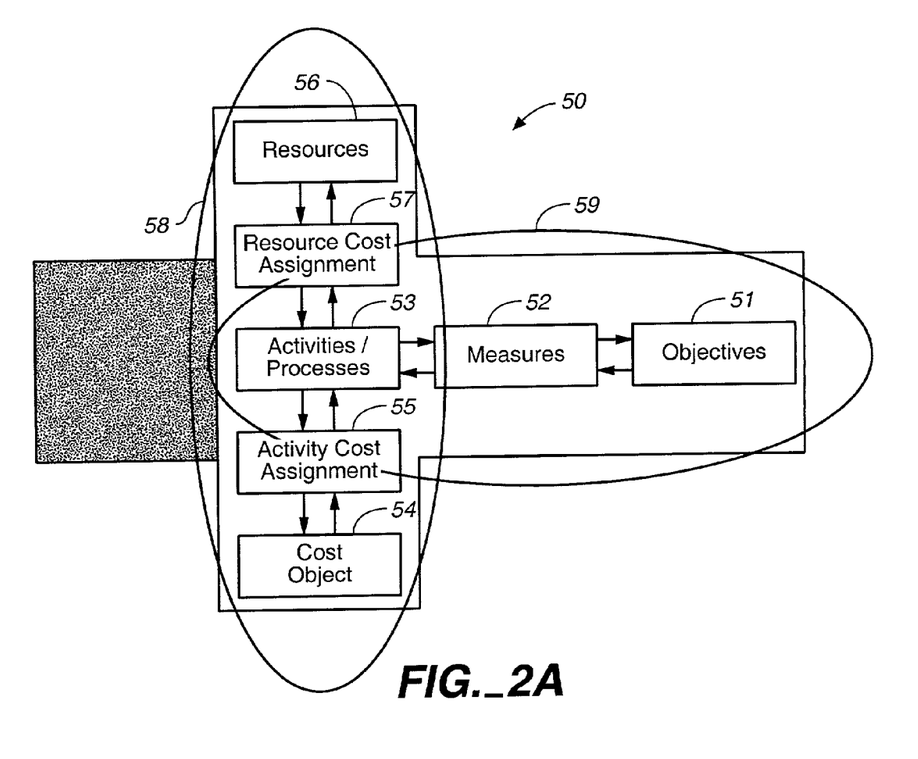
FIG. 2A is a simplified block diagram illustrating the interrelationships between operations in an activity-based management and supply chain performance management process.

FIG. 2A is a simplified block diagram 50 illustrating the interrelationships between operations in an activity-based management and supply chain performance management process. The horizontal blocks within oval 59 pertain to manufacturing supply chain performance. Measures 52 link performance objectives 51 to the activities or processes 53 that are taking place. The vertical blocks within oval 58 concern cost analysis considerations for the product. Cost objectives 54 in view of activity cost assignments 55 influence the activities or processes 53, and the available resources 56 and resource cost assignment considerations 57 also influence the activities or processes 53. The performance and cost consideration ovals 58 and 59 intersect at, and drive, the activities and processes 53 pertaining to the manufacture of a product. In general, manufacturers typically only consider performance goals (oval 59) or only consider costs (oval 58) when manufacturing a product. The techniques described herein marry considerations from both realms to permit a manufacturing company to determine the best combination of factors to use to obtain optimal results (optimal profits). The process 50 could be presented as an online analytical processing technique to permit a company to determine the best mix of assignments of resource cost to activities or processes, as well as the activity cost assignments to cost objects. Such a supply chain performance management system is capable of evaluating key performance indicators for processes along the supply chain input for decision making in profit optimization applications. With both instruments and the content of supply chain processes based on a supply chain operations model or some other company-customized supply chain process model, a company is capable of determining product and production cost in an adaptively changing supply chain network.

Figure 2B:
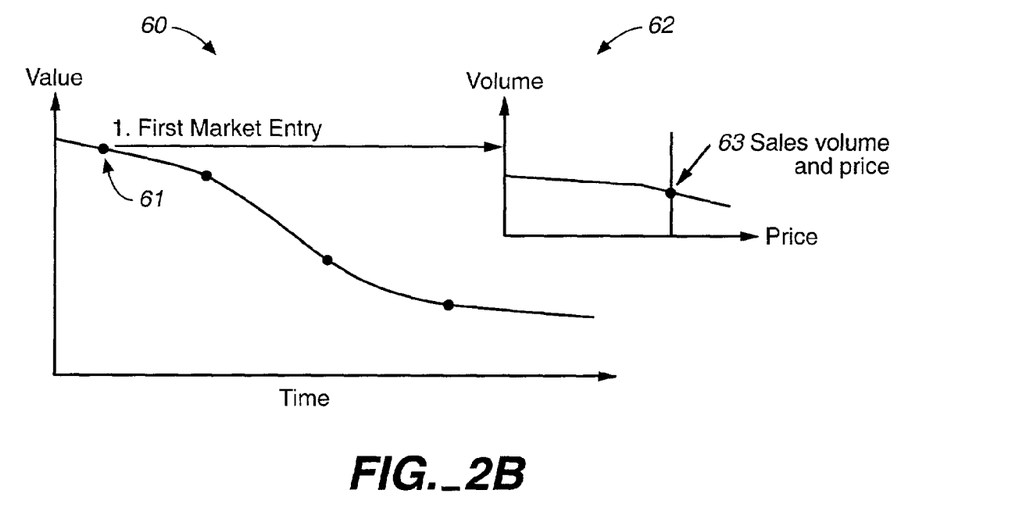
FIGS. 2B to 2E are graphs to illustrate the concept of adaptive pricing in the value life cycle of a product.
Figure 2C:
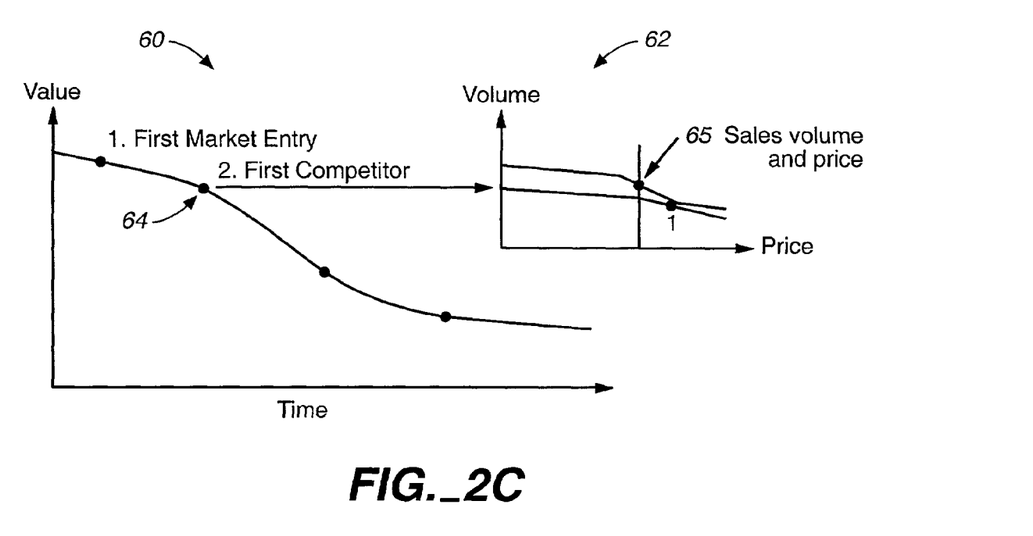
Figure 2D:
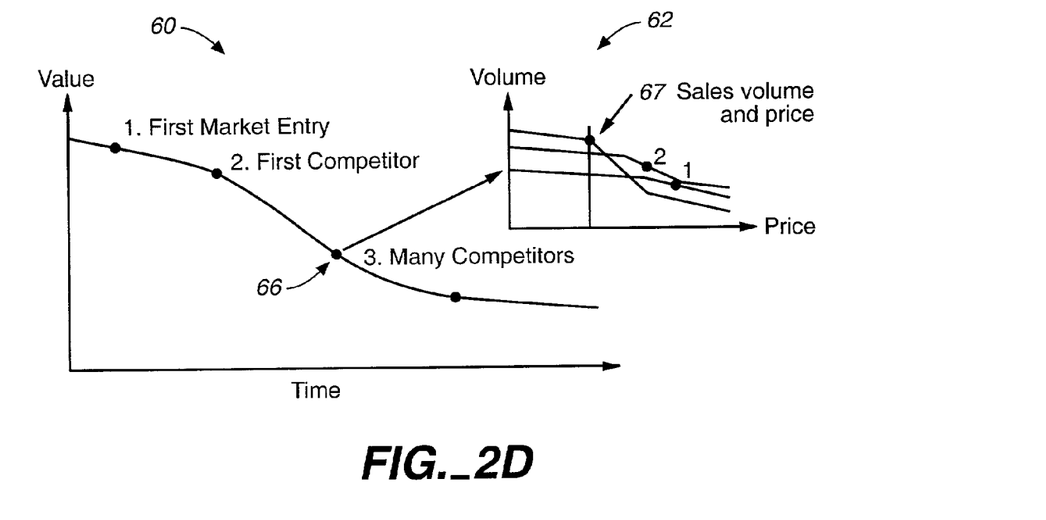
Figure 2E:
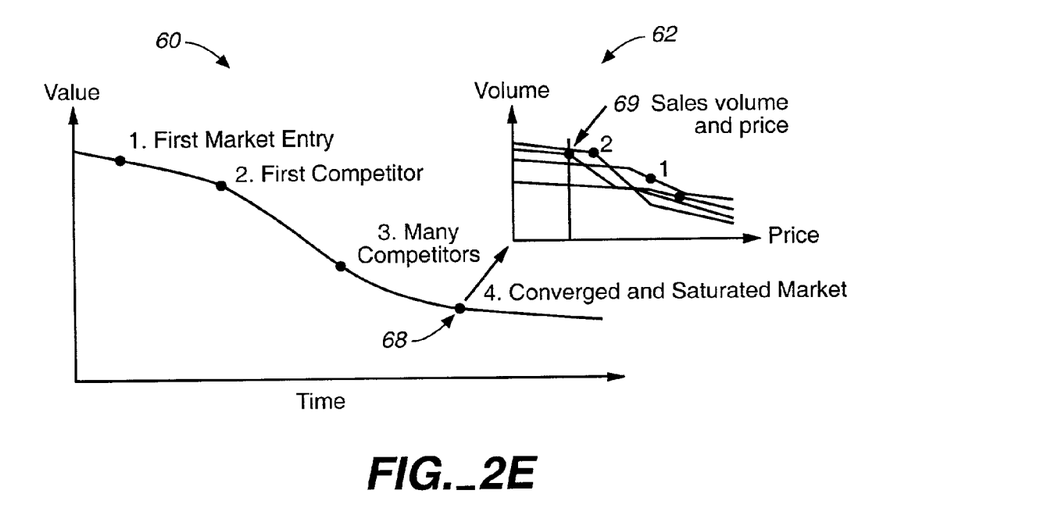

FIGS. 2B to 2E are graphs to illustrate the concept of adaptive pricing in the value life cycle of a product. FIG. 2B includes a value to time graph 60 and an associated product volume to price graph 62. The graph 60 shows first market entry 61 of the product wherein the product has a high value, and the graph 62 shows a sales volume and price point 63 indicating that the optimal price point in this example is where the volume is quite low and the product price is fairly high. FIG. 2C illustrates the same value to time graph 60 at a point 64 wherein the first competitor enters the market. In this case the product value is lower, and as shown in graph 62 of FIG. 2C at point 65 the optimal price has been lowered and the sales volume is higher. The graph 60 of FIG. 2D illustrates the product life cycle wherein many competitors have entered the market, and at point 66 the product value has diminished. Consequently, as shown in graph 62, at point 67, the product price has been reduced again and the sales volume has increased. The graph 60 of FIG. 2E shows that at some later time at point 68 the market is saturated and the product value is low so that the product price, as shown in graph 62, has been lowered again. At this time, however, the sales volume has not increased and may even decrease so that the value of manufacturing this product has diminished. Thus, FIGS. 2B-2E illustrate how adaptive pricing in the value life cycle of a product can be used to increase or maintain profits. In particular, a manufacturer adjusts the price of a product by accepting different price elasticity functions at different phases of the product life cycle to increase or at least maintain profits.

Figure 3:
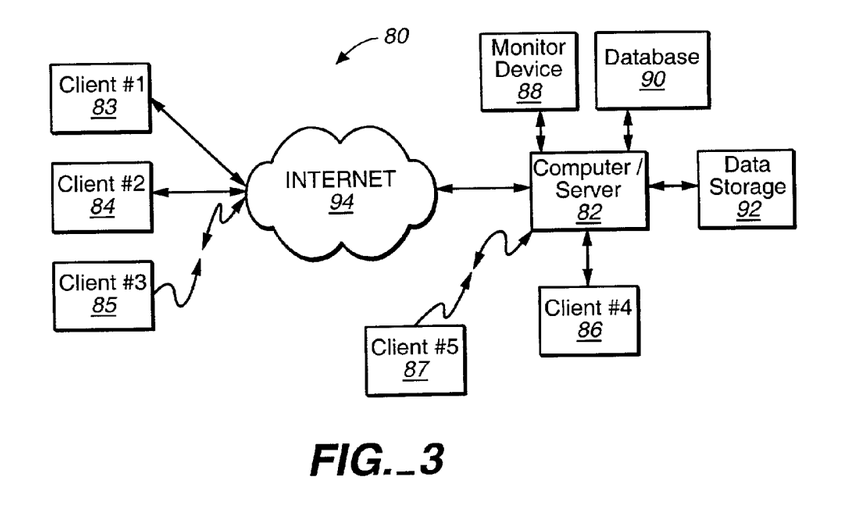
FIG. 3 is a simplified block diagram of an implementation of a system for optimizing profit for a manufacturing supply chain according to the invention.

FIG. 3 is a simplified block diagram of an implementation of a computerized or on-line system 80 for optimizing profit for a manufacturing supply chain. A programmable computer or server 82 may be configured to run one or more application programs to process data and provide results in response to requests from client computers 83, 84, 85, 86 and 87. The server 82 may be connected to a manufacturing supply chain monitor device 88, a database 90 and a data storage unit 92. The computer or server 82 and the client computers 83-87 may be any general purpose programmable computer, such as IBM-type personal computers or Apple-type computers. Alternately, the client computers may be any type of portable electronic data device capable of sending and receiving data, such as a personal digital assistant (PDA). The computer, or server 82, client computers 83-87, database 90, and data storage unit 92 may all be in different locations, and may communicate via a network connection, via the internet 94 and/or over wireless connections or other communication links. Authorized manufacturing employees can utilize client computers to access the server 82 over direct or wireless connections via the internet 94, or by direct or wireless network connections, as shown. The server 82 may contain various application programs, which are utilized by the authorized employees to determine how best to optimize profits under various circumstances and utilizing various techniques which are described in detail below.

In an implementation, a profitable-to-promise application extends the available-to-promise (ATP) capabilities of a supply chain by considering the initial cost of components required to manufacture a product, as well as dynamically considering the cost for substitution of components or locations where components are drawn from. In particular, the cost of substitution of components or products, and their locations, are determined at or close to the time of manufacture. Such timely information permits accurate determinations to be made so that the product can be manufactured and sold at a profitable margin.

There are different levels of implementation and sophistication of such a profitable-to-promise solution. The various levels and aspects are listed and described below in order of increasing complexity.

In an implementation, profitability is ensured by using available-to-promise rules (ATP rules) defined on the basis of customer segments. Material components and capacities are allocated specifically to preferred customer segments such as high value customer segments. The ATP rules ensure that expensive service or product or location substitutions are only taken into account for high value customers during an ATP check. The ATP check is an initial analysis of available products and their locations to determine the feasibility of various substitution possibilities. A profit-oriented ATP check may be made with the existing SAP APO product, but it does not take into account costing information.

Figure 4:
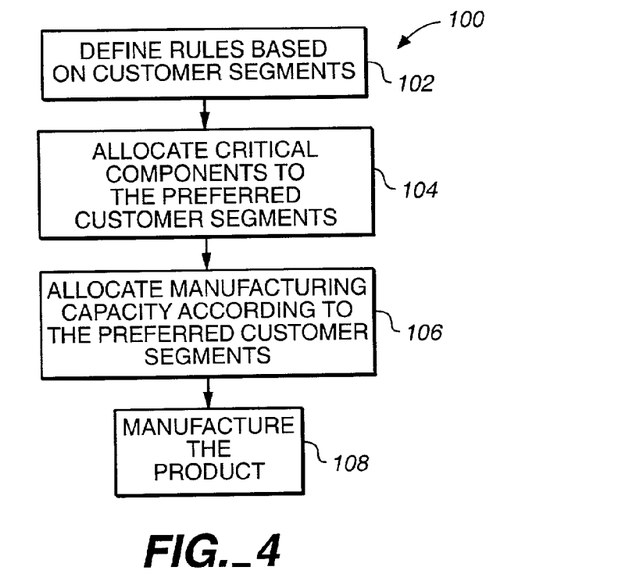
FIG. 4 is a flowchart of an implementation of a profit optimization method.

FIG. 4 is a flowchart 100 of an implementation of a profit optimization method. Rules to follow for profitability concerning product components and manufacturing capacity are defined 102 based on the customer segments. The customer segmentation application 25 may be used to obtain customer segmentation data. Critical components needed to manufacture the product are then allocated 104 to the high-value or preferred customer segments, and capacity is allocated 106 to these customer segments. The product is then manufactured

108. Manufacture of a product in this manner ensures that profitability goals are achieved.

Figure 5:
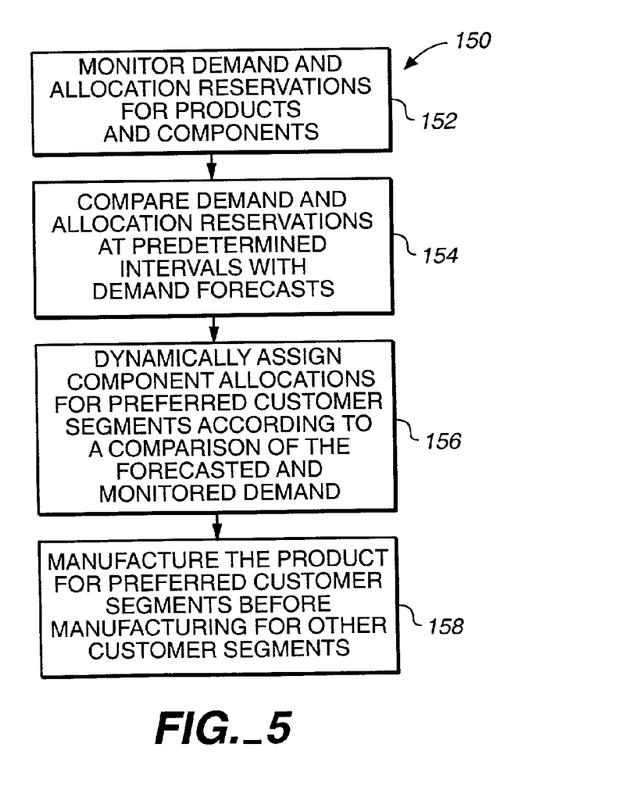
FIG. 5 illustrates a method for optimizing profit based on a dynamic prioritization of product components.

Another implementation keeps cost low for product and component location substitution in less profitable customer segments. In particular, FIG. 5 illustrates a method 150 for optimizing profit based on a dynamic prioritization of product components.

The demand and allocation reservations for products and components are monitored 154 continuously and, in predetermined intervals such as days or hours, compared 156 with the demand forecast. Under the assumption that the forecasted demand leads only to inevitable product and location substitutions, a deviation from the forecasted demand patterns would result in higher cost. The assignments of preferred customer segments to certain prioritized material allocations are dynamically changed 156 according to the comparison of forecasted and monitored demand. The product is then manufactured 158 for preferred customer segments before manufacturing for other customer segments. This ensures that the high valued or preferred customer groups will receive the requested material in time, while lower priority groups (customer segments with little expected profit) have to draw on material allocations or components at later periods, or are rejected if no substitutions are available. (The preferred customer segments may be identified according to the respective rules defined as pointed out above for profit-oriented ATP-checks).

In order for the dynamic prioritization of product components technique to operate successfully, it is necessary to monitor the consumption of allocation in a given period. This may be done on a component level in the ATP, or such information can be stored in a data warehouse 27 or other database. A monitor (monitor agent) must be implemented capable of calculating the expected consumption rate, or capable of triggering the adjustment of selection values based on remaining component allocation levels which depends on how consumption rates are forecasted. For example, if the consumption rate is a linear function, then the expected consumption rate could be calculated by average techniques or linear regression. In addition, this monitor must determine new selection priorities based on the above information in regular time intervals. The new set of selection priorities will then avoid certain substitutions to largely consumed location products, or consequently substitute some products for certain customer segments. For example, consider the situation where components X, Y and Z are initially prioritized as first, second and third, respectively, out of eight components. The manufacturer is running low on component X, and component Z has not been selling well. In order to force the system to substitute component Z when component X reaches a very low level, the priority of component Y can be changed to a much lower priority such as "fifth" and the priority of component Z could be changed to second. In order for such a technique to be successful, current sales information is required.

There are several case specific issues that need to be considered in order to achieve the goals of dynamic prioritization of products. The considerations include where the needed consumption information is stored; how the selection priorities are determined; which products are involved in the dynamic (or adaptive) prioritization of components; and which authorization concepts are necessary and/or suitable for changing assignments of customer segments to allocations (such as alerting a user) and suggesting new priorities with approval and possible alteration. A suitable interface, such as an intuitive computer display, can be presented so that a user can interact with the system to simulate how different priority choices would affect the outcome. Such simulations may be run only for "high value" or expensive products, such that this dynamic strategy may be applied only where a manufacturer would expect a good return.

Figure 6:
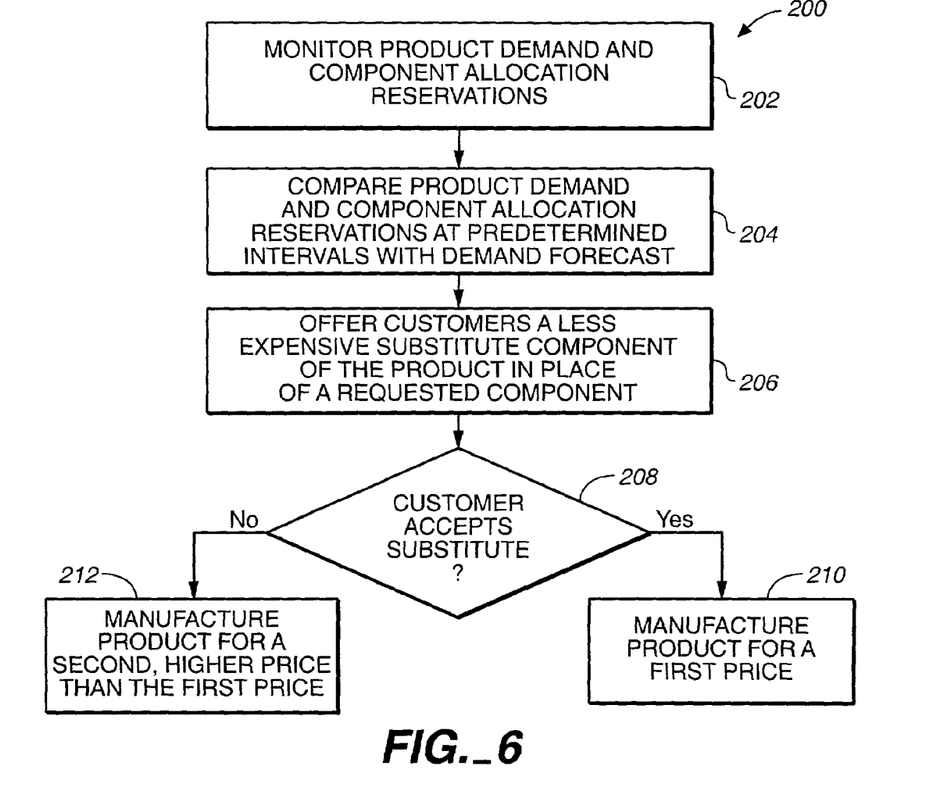
FIG. 6 illustrates a method for optimizing profit based on a dynamic price-driven model of demand.

Another profit optimization implementation keeps requested demand in line with available supply at the best prices achievable (to ensure the highest profit). In particular, FIG. 6 illustrates a method 200 for optimizing profit based on a dynamic price-driven model of demand.

The demand and allocation reservations for products and components are monitored 202 continuously and, in regular intervals such as days or hours, compared 204 with the demand forecast. Rather than adjusting the allocation of customer segments to material allocations, the price of components or characteristics is used as an instrument to steer demand away from strongly requested materials towards better available materials. Thus, customers are offered 206 a less expensive substitute component or components of the product in place of a requested component. If the customer accepts 208 the offer, then the product is manufactured 210 for a first price. If the customer does not accept the offered substitute component, then the product is manufactured 212 with the desired component for a second, higher price. Thus, if inventory of a particular component A is low but inventory of component B is high, the manufacturer may raise the cost of A and/or lower the cost of B to shift demand. Such a technique reduces the cost of substitutions, or if the customer insists on the desired component choice, increases the revenue for highly demanded products and/or components. In order for such a technique to work, the system must dynamically monitor the progress of product demand and the inventory of component parts so that prices for components can be adjusted in a timely manner.

Consequently, forecasts and actual demands for product components are compared and lead to price changes of components. These price changes may be imposed in fixed increments. Alternately, the optimal price changes (and thus the optimal new prices) could be determined according to price sensitivity functions using an adaptive pricing engine. This profit optimization application therefore limits or controls costs for specific products or configurations, and adapts the revenue model to the current situation.

In order for this dynamic price-driven technique to be successful, a manufacturer must be willing to support an adaptive pricing scheme. A pricing engine visible in the customer or call center interface (for example, SAP Internet Pricing & Configuration Engine offered by SAP AG and SAP America, Inc.) must be updated with a new pricing scheme consistently and in regular intervals. In addition, a relationship must be defined between expected over/under-consumption fluctuations that may occur during a period and the price change. In general, a price elasticity value must be known to calculate the relationship. An optimal pricing scheme can only be determined with an adaptive pricing engine that takes into account price elasticities and cannibalization effects learned from historical data. The historical data may be obtained from a data warehouse or other database, which may be developed by a manufacturer and may be industry specific. Based on pricing engine results, an initial increase in price could be made in specific incremental price steps.

There are several additional case specific issues that should be considered in order for the goals of the dynamic price-driven model to be achieved. The conditions include a determination of which components are considered for such a costing approach; how price changes are determined, and whether these price changes are based on information stored in or determined from the data warehouse, such as past consumption patterns related to the respective product or to option prices; the desired price stability and how often prices can be changed; and options that can be presented as prices in a configuration engine. A heavily consumed component might contribute to several options and will thus affect more than one price.

Figure 7:
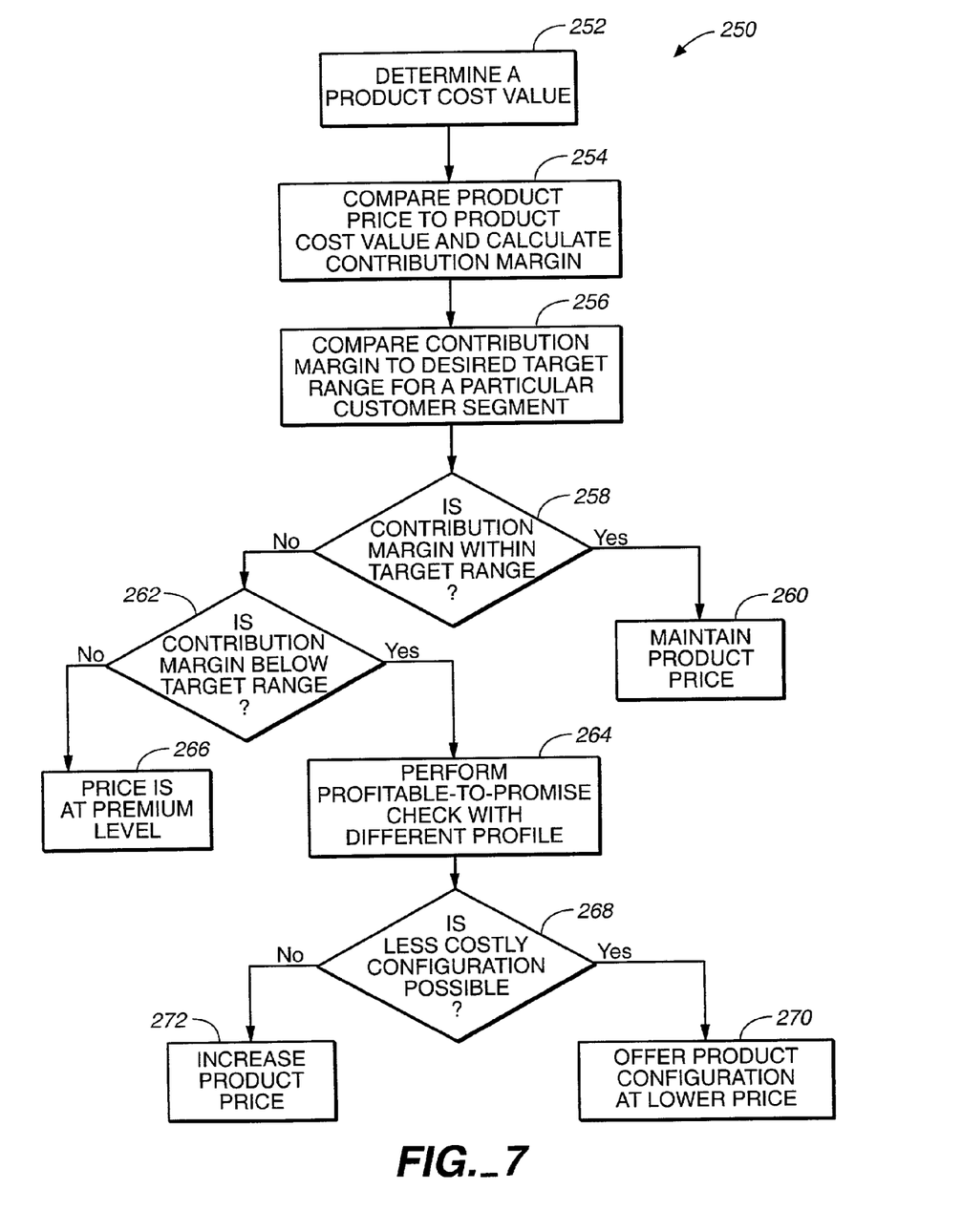
FIG. 7 illustrates a profit optimization method wherein component costs are considered during a profitable-to-promise check.

Yet a further implementation of profit optimization ensures that unprofitable products are not offered to customers. In particular, FIG. 7 illustrates a profit optimization method 250 wherein component costs are considered during a profitable-to-promise check.

This technique considers real cost (at an sufficiently aggregated level) during the profitable-to-promise check to ensure that customer orders are priced profitably in any supply chain state, and possibly also cover the cost for product and location substitutions. Several different types of product cost should be considered in profit determination when a product is ordered. These costs may include assembly costs, available components with known purchase cost, location substitutions (with transportation cost added), substitute components having a higher purchase cost, and any urgent missing supplies having an associated real cost of purchase. Thus, referring to FIG. 7, a product cost value is determined 252 based on one or more of the costs described above.

Once cost and price are determined, a contribution margin is determined 254 and compared 256 to a desired target range for a particular customer segment. If the contribution margin is within the target range 258 then the product price is maintained 260. If the contribution margin is below the target range 262, a profitable-to-promise check is performed 264 using a different profile to increase the contribution margin to the desired level, which may include generating a lower product price by allowing only a certain amount or a certain cost for substitutions or no substitutions at all. If a less costly product configuration is possible 268, then the product can be offered 270 at a lower price. If not, then the product price is increased 272 in order to maintain the required contribution margin. If the product price is found to be above the target range 262, the product is being offered 266 to the customer at a premium price and no adjustments are necessary.

The above cost profiles must be updated regularly (in an ultimately ideal case after each order). Activity-based costing information can help determining process dependent cost such as transportation or assembly cost.

The current SAP APO ATP solution offered by SAP AG and SAP America, Inc. allows limits to be placed on the number of product component substitutions during an ATP check. If there is more than one planned substitution, a user can select the relevant one. If more than one relevant substitution are returned, then the user selects between options. Moreover, an ATP check could run with different profiles (no substitution limitation and a cap on the allowed substitution cost) to allow a choice between results.

In order for the goals of the component costs during profitable-to-promise check to be met, the current cost for components, assembly and transportation (transfer shipments as well as customer delivery) must be maintained and available. In addition, restrictions for alternative profitable-to-promise checks must be defined and customer segments specific. Yet further, a suitable aggregation level of production, sales, transportation and promotional cost must be defined.

There are several additional case-specific issues that should be considered. The conditions include the frequency of cost determinations; the performance and application load of the profitable-to-promise implementation as a complete process; and whether an update of rules during an ATP check seems inadequate, difficult and/or too resource-consuming to perform.

Figure 8:
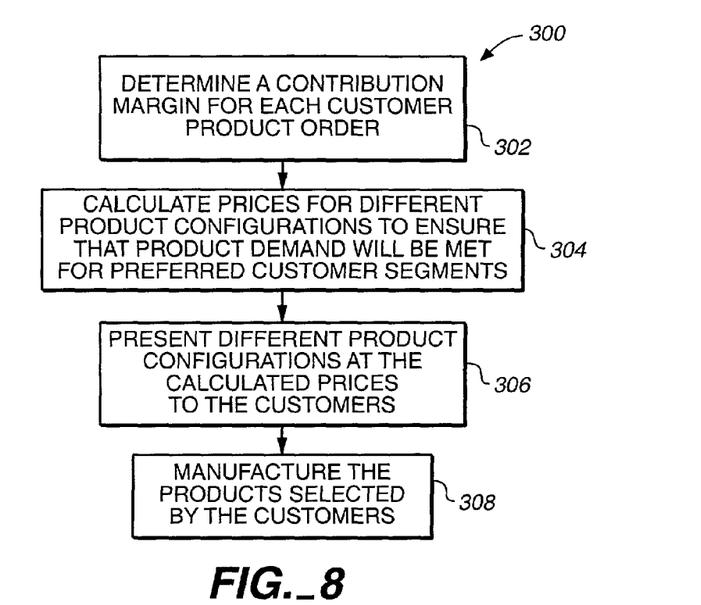
FIG. 8 illustrates a profit optimization method wherein a product price is determined during the profitable-to-promise check

FIG. 8 illustrates a profit optimization method 300 wherein a product price is determined during the profitable-to-promise check. The objective is to improve the cost foundation of decision making by utilizing information about the current state of the supply chain when determining cost for fulfilling a specific request.

Referring to FIG. 8, a contribution margin for each order is determined 302 based on product price and cost for components, production, sales, transportation, promotion, marketing and other factors. This cost determination improves the objectivity for price negotiations by sales personnel and helps to determine potential alternatives for fulfilling the customer need that are less costly. Prices are calculated 304 for different product configurations to ensure that product demand will be met for preferred customer segments. Next, a selection of different product configurations with different prices are presented 306 to each customer based on that customer's product request. The customer then chooses between different fulfillment options that each differ in their conditions, such as the original product demand (no component substitutions), lead time, price, or quality. The product is then manufactured 308 according to the customer's selection. Thus, a customer may choose to receive a product at a later time for a cheaper price wherein no substitute components are used, or to receive the requested product soon but at a higher price and with one or more substitute components. This method therefore utilizes price and substitution capabilities to drive demand such that the preferred or most valuable customers can be served at any time.

In order to be able to present concurrent responses on a given customer request, a strategy must be in place that defines how the different responses are determined, and how many responses are generated for a customer in any one of a plurality of situations. It is also important to manage the volume of data presented in response to a customer (especially in an online environment) to guarantee that the system performs acceptably fast.

Figure 9:
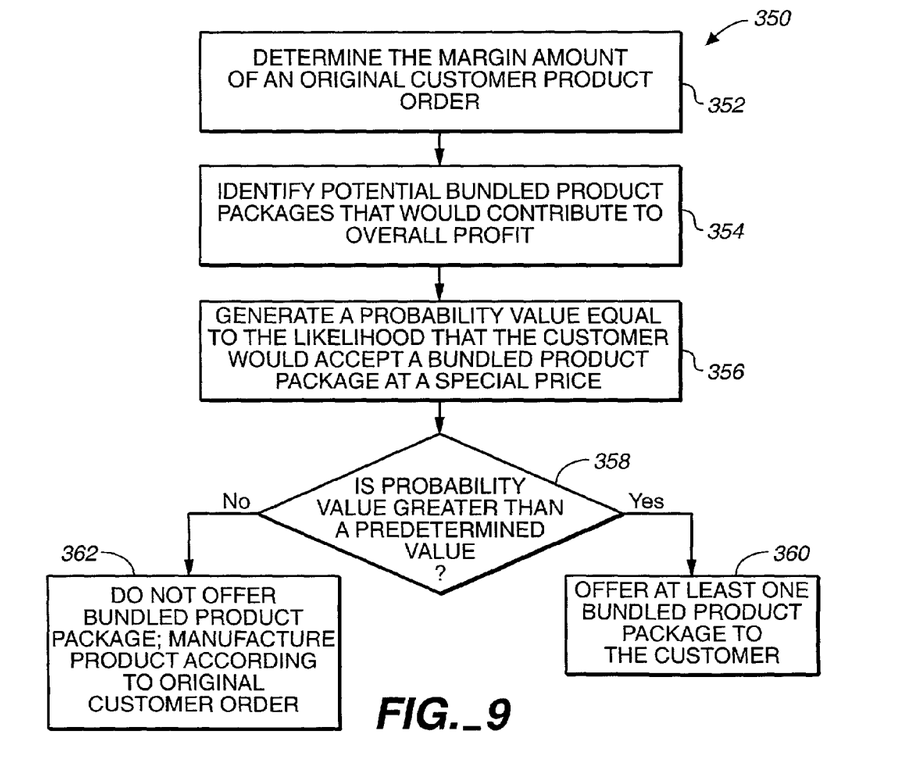
FIG. 9 illustrates a profit optimization method wherein spot bundle pricing is offered to customers.

FIG. 9 illustrates a profit optimization method 350 wherein spot bundle pricing is offered to customers. The objective is to use bundling strategies and suggestive pricing to achieve defined sales goals.

Instead of just fulfilling the requested demand, the spot bundle pricing strategy attempts to offer to the customer products or services that relate to the original demand and that can be delivered at a positive profit margin together with the original demand. Referring to FIG. 9, the profit margin amount is determined 352 for the original customer product order. Potential bundled product packages are identified 354 that would contribute to overall profit. Next, a probability value is calculated 356 that is equal to the likelihood that the customer would accept a bundled product package at a special price (such as a discount price). If the probability value is greater than a predetermined value 358, then at least one bundled product package is offered 360 to the customer. If the probability is not greater than the predetermined value, then a bundled product package is not offered 362 and the product is manufactured according to the original customer order. The probability value may be an arbitrary number, such as a 75% (seventy-five percent) chance based on historical customer data that a bundled product package would be accepted, or may be based on a feasibility calculation, or may be based on any other basis identified by the manufacturer.

The spot bundle package and pricing technique opens up the opportunity for a manufacturer to offer attractive products to customers in a manner that does not jeopardize the ability to fulfill other customer demands. Knowledge of the profit margin of the original order fulfillment, and knowledge about potential synergies of delivering more than the originally requested demand, may permit special discounts to be offered depending on the price-elasticity of the additional offering. Information about the customer is also required to determine the willingness to accept the additional offer at a price that optimally contributes to the overall profit (in terms of expected acceptance and profit margin). In addition, order-specific pricing of bundles may be implemented according to a pricing and discount strategy (which may be derived from customer price elasticity functions).

The invention as described above can be implemented in digital electronic circuitry, or in computer hardware, firmware, software, or in combinations of them. Apparatus of the invention can be implemented in a computer program product tangibly embodied in a machine-readable storage device for execution by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include by way of example, both general and special purpose microprocessors. Generally, a processor will receive instructions and data from a read-only memory and/or a random access memory. Generally, a computer will include one or more mass storage devices for storing data files; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, several of the profit optimization implementations may be combined to provide further data for determining how best to allocate resources and price products to reach manufacturing goals. Accordingly, other embodiments are within the scope of the following claims.

What is claimed is:

1. A profit optimization method comprising:
   monitoring, by a computer, actual product demand and allocation reservations for product components;
   comparing, by the computer, the actual product demand and component allocation reservations with demand forecasts at predetermined intervals, the demand forecasts to predict future unknown product demand;
   dynamically assigning, by the computer, component allocations for preferred customer segments according to a comparison of the forecasted and monitored actual demand;
   dynamically assigning an allocation priority to a component of a product;
   selecting the component for use in manufacturing the product based on the allocation priority; and
   manufacturing the product for the preferred customer segments before manufacturing the product for other customer segments.

2. The method of claim 1 wherein preferred customer segments are determined according to predefined rules.

3. The method of claim 1 wherein monitoring product demand and allocation reservations is conducted in regular intervals.

4. The method of claim 1 further comprising alerting a user when a component allocation is changed.

5. An article comprising a non-transitory computer-readable medium that stores executable instructions for causing a computer system to:
   monitor product demand and allocation reservations for product components;
   compare the product demand and component allocation reservations with demand forecasts at predetermined intervals, the demand forecasts to predict future unknown product demand;
   dynamically assign component allocations for preferred customer segments according to a comparison of the forecasted and monitored actual demand;
   dynamically assign an allocation priority to a component of a product;
   select the component for use in manufacturing the product based on the allocation priority; and
   generate instructions to manufacture the product for the preferred customer segments before manufacturing the product for other customer segments.

6. The article of claim 5 further comprising instructions to cause the computer system to determine customer segments according to predefined rules.

7. The article of claim 5 further comprising instructions to cause the computer system to monitor product demand and allocation reservations in regular intervals.

8. The article of claim 5 further comprising instructions to cause the computer system to alert a user when a component allocation is changed.

9. A profit optimization system comprising:
   at least one database storage unit; and
   at least one processor coupled to the storage unit, wherein the processor is operable to:
   monitor actual product demand and allocation reservations for product components;
   compare the actual product demand and component allocation reservations with demand forecasts at predetermined intervals, the demand forecasts to predict future unknown product demand;

dynamically assign component allocations for preferred customer segments according to a comparison of the forecasted and monitored actual demand;

dynamically assign an allocation priority to a component of a product;

select the component for use in manufacturing the product based on the allocation priority; and generate instructions to manufacture the product for the preferred customer segments before manufacturing the product for other customer segments.

10. A profit optimization method comprising:

dynamically monitoring, by a computer, product demand and component allocation reservations;

comparing, by the computer, the monitored actual product demand and component allocation reservations to a forecasted demand, the forecasted demand to predict future unknown product demand;

offering customers at least one less expensive substitute component of the product in place of a requested component based on a priority of the at least one less expensive substitute component in comparison with a priority of another substitute component of the product; and manufacturing the product for a first price if the substitute component is accepted, or manufacturing the product for a second, higher price if the substitute component is not accepted and determining in the computer, a change in the price according to a price sensitivity function.

11. The method of claim 10, further comprising:

changing a price of the product in fixed increments.

12. The method of claim 10 wherein at least one customer offer includes an optimal price based on a price elasticity value and cannibalization effects.

13. An article comprising a non-transitory computer-readable medium that stores executable instructions for causing a computer system to:

dynamically monitor actual product demand and component allocation reservations;

compare the monitored actual product demand and component allocation reservations to a forecasted demand, the forecasted demand to predict future unknown product demand;

generate a customer offer including at least one less expensive substitute component of the product in place of a requested component based on a priority of the at least one less expensive substitute component in comparison with a priority of another substitute component of the product; and generate instructions to manufacture the product for a first price if the substitute component is accepted, or to manufacture the product for a second, higher price if the substitute component is not accepted determine a change in a price according to price sensitivity functions.

14. The article of claim 13 further comprising instructions to change a price in fixed increments.

15. The article of claim 13 further comprising instructions to wherein offer an optimal price based on a price elasticity value and cannibalization effects.

* * * * *

UNITED STATES PATENT AND TRADEMARK OFFICE
CERTIFICATE OF CORRECTION

| | | |
|---|---|---|
| PATENT NO. | : 7,996,329 B1 | |
| APPLICATION NO. | : 10/137713 | |
| DATED | : August 9, 2011 | |
| INVENTOR(S) | : Karsten Schierholt | |

It is certified that error appears in the above-identified patent and that said Letters Patent is hereby corrected as shown below:

In the Claims, Column 14, Claim 13, line 22, please delete "accepted determine" and insert
--accepted; and
    determine--.

Signed and Sealed this
Ninth Day of April, 2013

Teresa Stanek Rea
*Acting Director of the United States Patent and Trademark Office*